US009485024B2

(12) United States Patent
Lee

(10) Patent No.: US 9,485,024 B2
(45) Date of Patent: Nov. 1, 2016

(54) AUTO COMMISSIONING FOR OPTIC DISTRIBUTED ANTENNA SYSTEM

(71) Applicant: Advanced RF Technologies, Inc., Burbank, CA (US)

(72) Inventor: Namchul Lee, Burbank, CA (US)

( * ) Notice: Subject to any disclaimer, the term of this patent is extended or adjusted under 35 U.S.C. 154(b) by 0 days.

(21) Appl. No.: 13/844,011

(22) Filed: Mar. 15, 2013

(65) Prior Publication Data

US 2014/0270787 A1 Sep. 18, 2014

(51) Int. Cl.
*H04B 10/2575* (2013.01)

(52) U.S. Cl.
CPC .............. *H04B 10/25753* (2013.01)

(58) Field of Classification Search
CPC ............ H04B 10/2507; H04B 10/25753
USPC ................................... 398/115, 116
See application file for complete search history.

(56) References Cited

U.S. PATENT DOCUMENTS

| 2002/0061763 | A1* | 5/2002 | Weissman | ............ | H04W 52/52 455/522 |
| 2011/0135308 | A1* | 6/2011 | Tarlazzi | ............... | H04B 7/0413 398/79 |
| 2011/0268449 | A1* | 11/2011 | Berlin | .............. | H04B 10/25753 398/115 |
| 2012/0134666 | A1* | 5/2012 | Casterline | ........ | H04B 10/25754 398/22 |

* cited by examiner

*Primary Examiner* — David Payne
*Assistant Examiner* — Omar S Ismail
(74) *Attorney, Agent, or Firm* — Lewis Roca Rothgerber Christie LLP

(57) ABSTRACT

An optic distributed system includes a head end unit (HE) comprising a head end radio frequency unit (HRFU), at least one remote unit (RU), a corresponding optic cable connected between the HRFU and the at least one RU, and a controller configured to detect a forward radio frequency (RF) signal received from a base transceiver station (BTS), to perform a system wide commissioning function on the HRFU corresponding to the detection, to perform the system wide commissioning function on the at least one RU in accordance with a signal intensity of the forward RF signal from the HRFU, and to perform the system wide commissioning function on the optic cable to compensate for losses in the optic cable during signal transmissions between the HRFU and the at least one RU.

19 Claims, 4 Drawing Sheets

AUTO COMMISSIONING FOR OPTIC DISTRIBUTED ANTENNA SYSTEM

BACKGROUND

1. Technical Field

Embodiments of the present invention relate generally to auto commissioning for an analog optic distributed antenna system, and more particularly to auto commissioning that enables or facilitates equipment settings to be made automatically.

2. Description of Related Art

A distributed antenna system is an apparatus that amplifies and sends signals from a base transceiver station (BTS), so that the signals can reach shadow regions where radio waves cannot or may be difficult to propagate to, such as in certain parts of large buildings, university campuses, stadiums, hospitals, and tunnels, among others. Distributed antenna systems also amplify signals transmitted by terminals located in shadow regions, and transmit the amplified signals to the BTS in a direction opposite to the direction described above.

SUMMARY

FIG. 1 illustrates a typical or conventional configuration of an analog optic distributed antenna system, where a BTS 100 interfaces with a distributed antenna system via a wired connection.

For illustrative purposes, in the conventional optic distributed system of FIG. 1, for a four-channel optic distributed antenna system connected to the BTS 100, four optic cables 104 and four remote units (RU)s 301 are connected to a head end unit (HU) 300. In other cases, a different number of optic cables and a different number of RUs may instead be implemented.

In the conventional analog optic distributed antenna system, a forward signal sent by the BTS is input to a head end radio frequency unit (HRFU) 201, where a level of the forward signal is appropriately adjusted by an HRFU electric attenuator 204. The adjusted forward signal is then input to an HE passive 202. Here, a branch signal is input to and electrical-to-optical (E/O) converted by an optic master unit 203, and is then distributed to the RUs 301 by an optic splitter. In some cases, a plurality of optic master units 203 may be connected, and a larger number of RUs 301 may be implemented.

Signals sent to the RUs 301 are O/E converted by an optic slave unit 401, and then sent to a downlink (DL) module 402. A level of these signals are appropriately adjusted by an electric attenuator 405 of the DL module 402, the adjusted signal is then passed through a duplexer 404, and then a resulting output is radiated. Commissioning of the conventional optic distributed system is performed through three steps, that is, HRFU input commissioning 207, optic commissioning 208, and RU module commissioning 209, as illustrated in FIG. 1. When a number of HRFUs and RUs in a system increases, a number of commissioning functions that are required to be performed increases in accordance with the increase in the number of HRFUs and RUs, rendering the system more cumbersome and less efficient.

A commissioning chart of a conventional optic distributed system will be described in conjunction with FIG. 2.

For illustrative purposes, commissioning of a conventional optic distributed system includes HRFU commissioning F600, optic commissioning F605, and RU commissioning F601, which includes RU sub band commissioning F602, F603, and F604, as illustrated in FIG. 2. A total number of performances of commissioning required for the optic distributed system may be computed based on the following Equation 1:

$$\text{Total number of required performances of commissioning} = [\text{number of HRFU bands} + \text{number of RU optic slaves} + (\text{number of RU bands} * \text{number of RUs})] \quad (1)$$

When applying Equation 1 to the optic distributed system of FIG. 1, for example, the distributed antenna system of FIG. 1 requires a total of nine performances of commissioning, based on the single HRFU, the four RUs, and the four optic cables that are connected to the HRFU and the respective RUs.

$$\text{Total number of required performances of commissioning in FIG. 1} = [\text{number of HRFU bands} + \text{number of RU optic slaves} + (\text{number of RU bands} * \text{number of RUs})] = 1 + 4 + (1*4) = 9$$

Since the conventional optic distributed system illustrated in FIG. 1 corresponds to a relatively simple system, excessive inconvenience and cumbersomeness may not be incurred even when commissioning is manually performed. In contrast, if a distributed antenna system is configured such that a plurality of bands is combined with a plurality of RUs, the number of performances of commissioning increases exponentially, and thus increased cumbersomeness and inefficiencies may be incurred, since longer installation times may be required, and the same tasks may be repeatedly performed.

Embodiments of the present invention are intended to provide system wide commissioning functionality that can commission all of the RUs at one time, in a more efficient and less cumbersome manner.

Accordingly, an object of embodiments of the present invention is to facilitate commissioning of a plurality of RUs and an HRFU that are connected to each other at one time or concurrently in a more efficient manner.

An auto commissioning functionality of a distributed antenna system in accordance with embodiments of the present invention may be facilitated with an HU including a forward input/output signal strength detector, an HRFU electric attenuator for adjusting signal strength, and a controller configured to perform adjustments to appropriate levels using compiled information, and then to perform auto commissioning. Such a system may further utilize RUs that include an RU output detector and an RU output adjusting electric attenuator.

An exemplary embodiment of the invention includes an optic distributed system including a head end unit (HE) with a head end radio frequency unit (HRFU), at least one remote unit (RU), a corresponding optic cable connected between the HRFU and the at least one RU, and a controller configured to detect a forward radio frequency (RF) signal received from a base transceiver station (BTS), to perform a system wide commissioning function on the HRFU corresponding to the detection, to perform the system wide commissioning function on the at least one RU in accordance with a signal intensity of the forward RF signal from the HRFU, and to perform the system wide commissioning function on the optic cable to compensate for losses in the optic cable during signal transmissions between the HRFU and the at least one RU.

Another exemplary embodiment of the invention includes a method of commissioning an optic distributed system including a head end unit (HU) with a head end radio frequency unit (HRFU), at least one remote unit (RU), and a corresponding optic cable connected between the HRFU and the at least one RU, the method including detecting a forward radio frequency (RF) signal received from a base transceiver station (BTS), performing a system wide commissioning function on the HRFU corresponding to the detection, performing the system wide commissioning function on the at least one RU in accordance with a signal intensity of the forward RF signal from the HRFU, and performing the system wide commissioning function on the optic cable to compensate for losses in the optic cable during signal transmissions between the HRFU and the at least one RU.

BRIEF DESCRIPTION OF THE DRAWINGS

The above and other objects, features and advantages of the present invention will be more clearly understood from the following detailed description, taken in conjunction with the accompanying drawings, in which.

DETAILED DESCRIPTION

Embodiments of the present invention will be described in detail below with reference to the accompanying drawings, throughout which the same reference numbers are used to designate the same or similar components.

Figure 1:
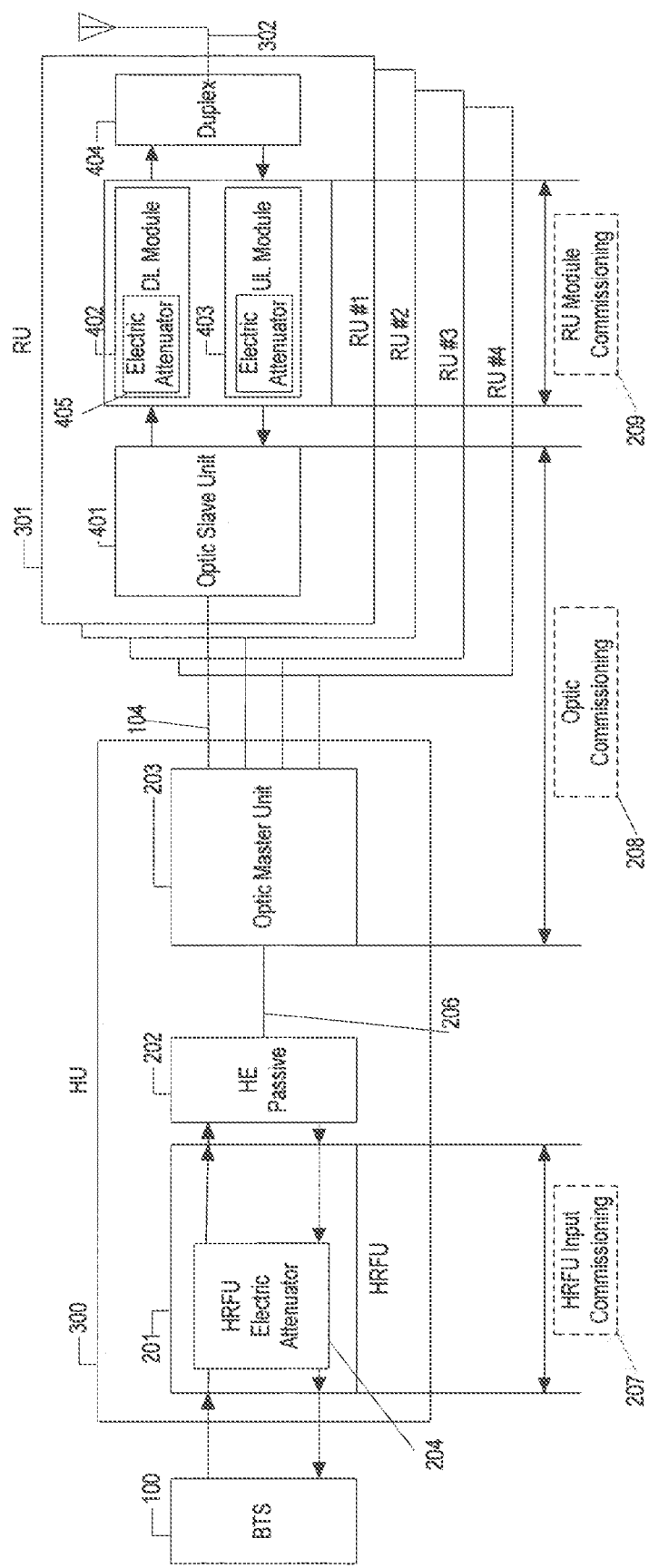
FIG. 1 is a diagram illustrating a configuration of a typical analog optic distributed antenna system with four RUs and commissioning setup.
Figure 2:
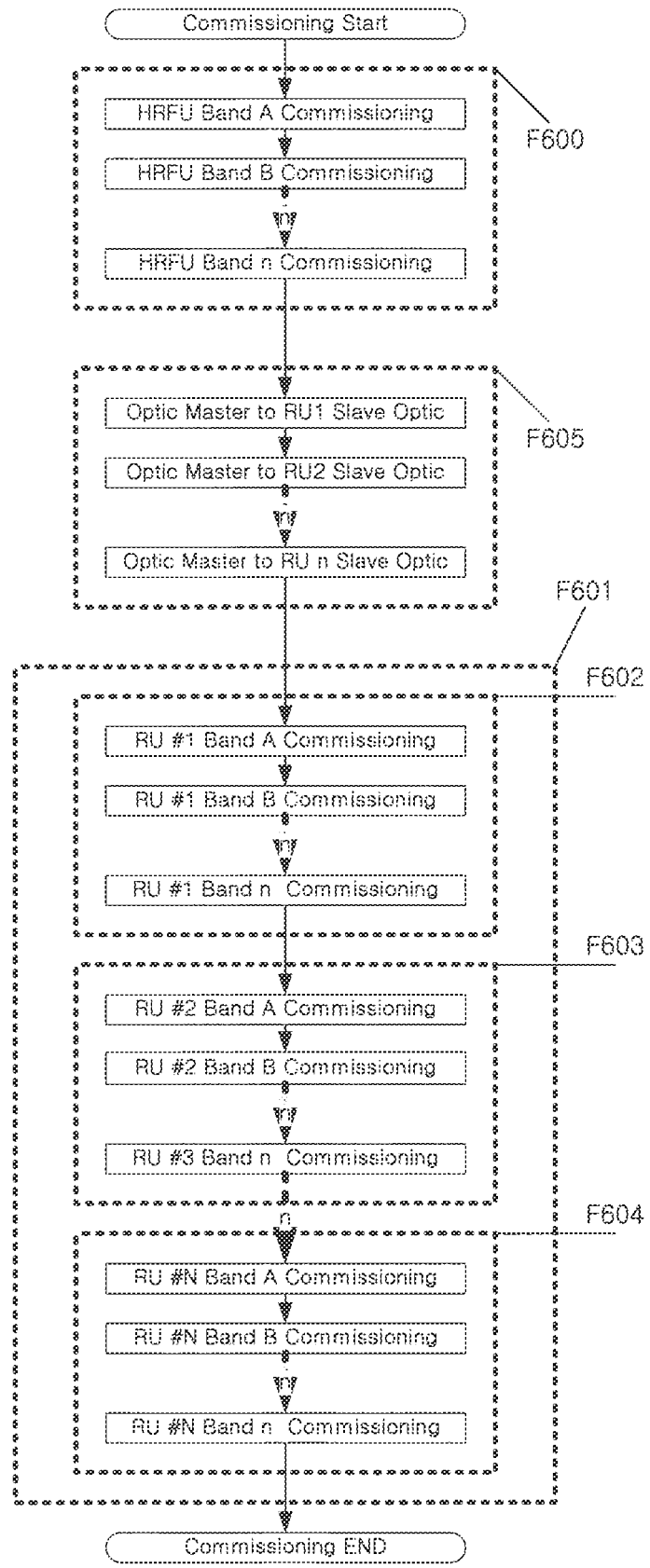
FIG. 2 illustrates a system commissioning chart for a typical analog optic distributed antenna system with four RUs.

As described above, FIG. 1 illustrates a system configuration of a typical optic distributed antenna system, and FIG. 2 illustrates a commissioning chart of the typical optic distributed antenna system.

Figure 3:
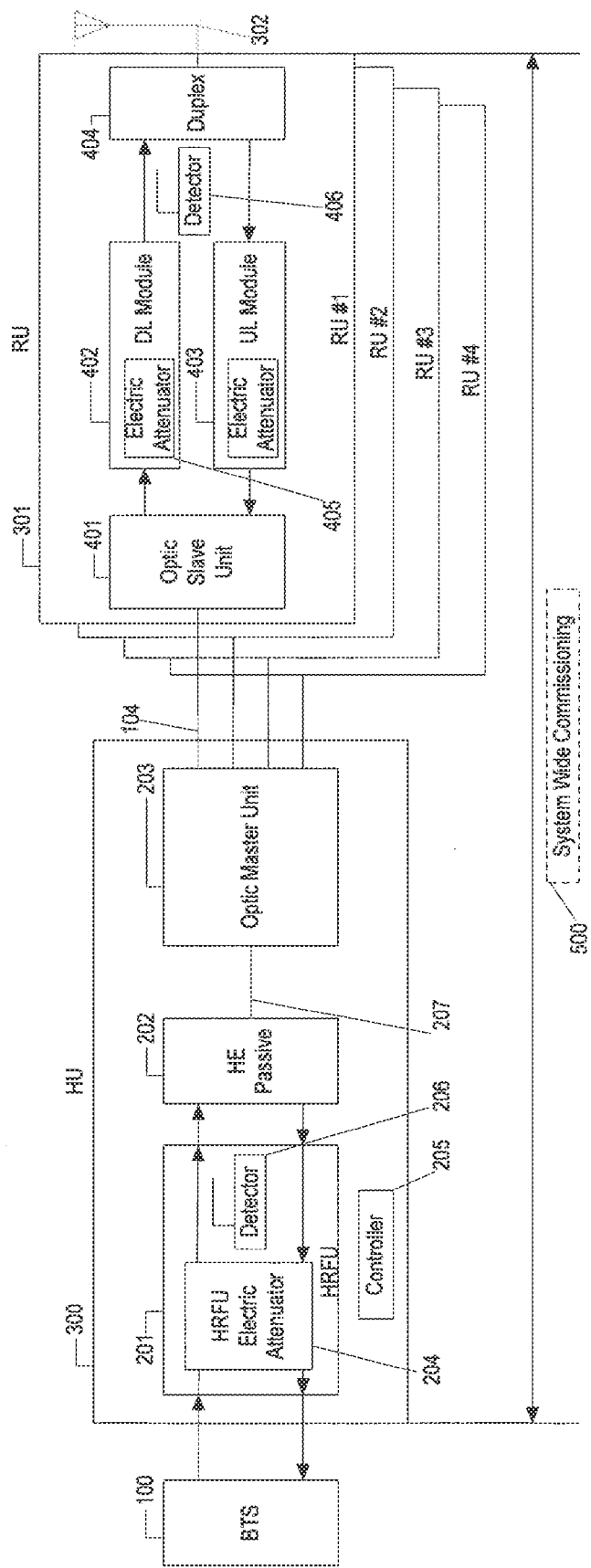
FIG. 3 illustrates a system configuration and system wide commissioning of an optic distributed antenna system in accordance with an embodiment of the present invention.

Meanwhile, FIG. 3 illustrates a system configuration and system wide commissioning of an optic distributed antenna system in accordance with an embodiment of the present invention.

As illustrated in FIG. 3, a distributed antenna system in accordance with an embodiment of the present invention includes an HU 300 and an RU 301.

Operation of the distributed antenna system illustrated in FIG. 3 will now be described. A forward signal from a BTS is input to an input port of an HRFU 201. An HRFU output detector 206 detects the signal strength of the forward signal, and an HU controller 205 controls an HRFU electric attenuator 204 of the HRFU 201, so that the forward signal can be adjusted and transmitted to an optic master unit 203 at an appropriate or desired level.

A same attenuator value used to perform control in the forward direction can also be applied to the HRFU electric attenuator 204 in the backwards or opposite direction.

The forward signal is sent from the HU 300 to one or more RUs 301 via a corresponding optic cable 104, and is input to a downlink (DL) module 402. Auto commissioning is performed by controlling an RU module electric attenuator 405 using, for example, the controller 205 of the HU 300 based on, for example, a value detected by the output detector 406 of the RU 301, so that a signal at a user-set level can be output or transmitted via an output port 302.

Settings for an electric attenuator in an uplink (UL) Module 403 of the RU 301 may be applied in a similar manner to the settings for the electric attenuator in the DL Module 402.

Figure 4:
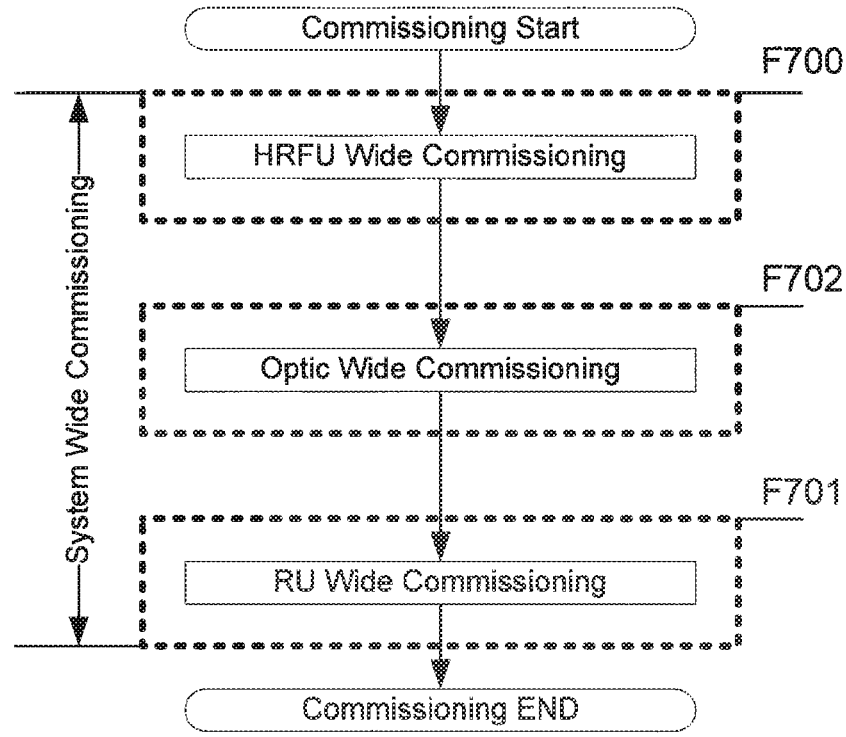
FIG. 4 illustrates a system wide commissioning chart for an optic distributed antenna system in accordance with an embodiment of the present invention.

FIG. 4 illustrates an auto commissioning chart for an optic distributed antenna system in accordance with an embodiment of the present invention. When auto commissioning is performed, system settings can be made by only performing three performances of commissioning, in particular, HRFU system wide commissioning F700, optic system wide commissioning F702, and RU system wide commissioning F701, while full system wide commissioning may be performed by inputting all of the setting values at one time.

Figure 5:
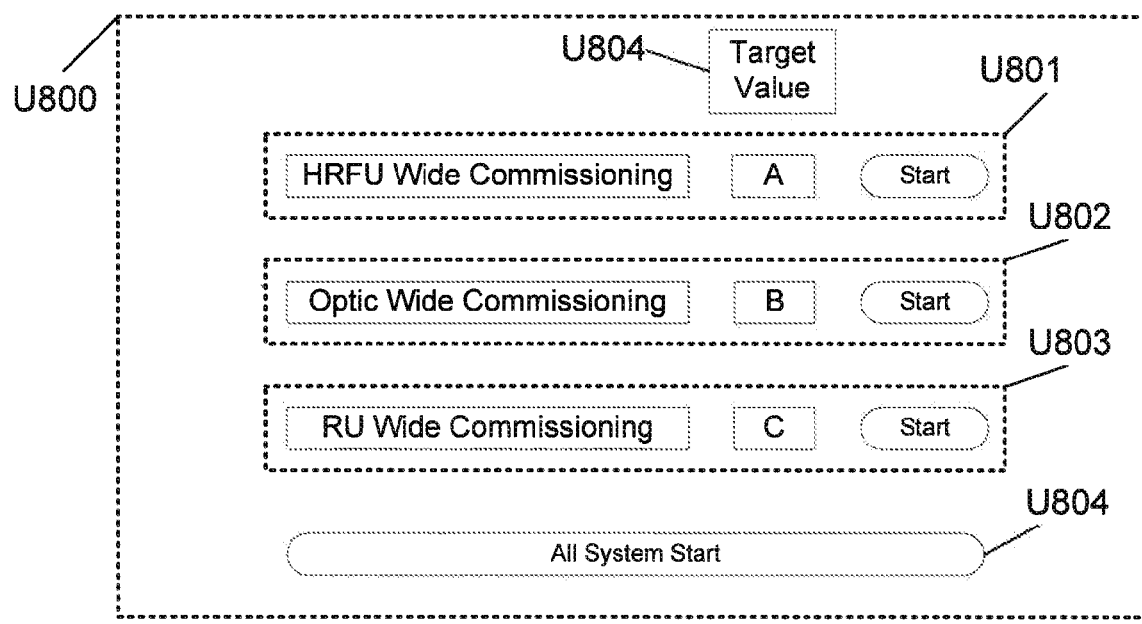
FIG. 5 is a diagram illustrating a user interface for controlling system wide commissioning for an optic distributed antenna system in accordance with an embodiment of the present invention.

FIG. 5 illustrates an example user interface for controlling a system wide commissioning function for an optic distributed antenna system in accordance with an embodiment of the present invention. FIG. 5 schematically illustrates a user interface that facilitates system wide commissioning on a per-step basis, where parameters for HRFU wide commissioning, optic wide commissioning, and RU wide commissioning can be individually set, and which alternatively facilitates a one-step full system wide commissioning.

The system wide commissioning according to embodiments of the invention is designed to be performed by entering a target value and then pressing a start button. On a per-step basis, the system wide commissioning includes setting an FIRM system wide commissioning U801, setting an optic system wide commissioning U802, and setting an RU system wide commissioning U803. Alternatively, full system wide commissioning can be performed by clicking on a button corresponding to an all system start U804.

According to embodiments of the present invention, the following effects, among others, can be achieved or realized.

First, convenience of installation can be more readily achieved, since system wide commissioning automatically performs commissioning for an entire optic distributed system, thereby simplifying processes.

Second, initial installation expenses can be reduced, because commissioning times and installation times for the entire system can be reduced by utilizing the system wide commissioning.

Third, potential installation errors made by an operator can be prevented or reduced, because commissioning can be automatically and more simply performed.

Fourth, a user can more easily perform commissioning with the provided user interface.

Although exemplary embodiments of the present invention have been disclosed for illustrative purposes, those skilled in the art will appreciate that various modifications, additions, and substitutions may be possible, without departing from the spirit and scope of the invention, as disclosed in the accompanying claims.

What is claimed is:
1. An optic distributed system comprising:
    a head end unit (HU) comprising a head end radio frequency unit (HRFU) and a first detector for monitoring signals at the HU;
    at least one remote unit (RU) comprising a second detector for monitoring signals at the RU;
    a corresponding optic cable connected between the HRFU and the at least one RU; and a single controller configured to detect a forward radio frequency (RF) signal received from a base transceiver station (BTS), and to perform a system wide commissioning function by concurrently performing commissioning on each of the HRFU, the at least one RU, and the corresponding optic cable when the forward RF signal is detected;

wherein the single controller is configured to receive signals detected by the first and second detectors, to control the commissioning on the HRFU according to a signal strength of the forward RF signal received from the BTS and detected by the first detector, to control the commissioning on the at least one RU according to a signal intensity of an output signal from the RU detected by the second detector, and to control the commissioning on the optic cable by compensating for losses in the optic cable during signal transmissions between the HRFU and the at least one RU.

2. The optic distributed system of claim 1, further comprising an attenuator configured to adjust the signal strength or signal intensity of the monitored signals according to the monitoring results, so that the adjusted signals have optimum outputs, wherein the controller is further configured to perform the system wide commissioning function to control the attenuator.

3. The optic distributed system of claim 1, wherein the optic distributed system is configured to operate an alarm based on the monitoring of the first detector.

4. The optic distributed system of claim 1, wherein the first detector monitors downlink signals at the HU.

5. The optic distributed system of claim 1, wherein the first detector monitors uplink signals at the HU.

6. The optic distributed system of claim 1, wherein the optic distributed system is configured to operate an alarm based on the monitoring of the second detector.

7. The optic distributed system of claim 1, wherein the second detector monitors downlink signals at the RU.

8. The optic distributed system of claim 1, wherein the second detector monitors uplink signals at the RU.

9. The optic distributed system of claim 1, wherein the controller is configured to perform the system wide commissioning automatically.

10. The optic distributed system of claim 9, further comprising a user interface for adjusting parameters of the system wide commissioning function performed by the controller.

11. The optic distributed system of claim 10, wherein the user interface is configured to allow the user to set a single target value for the entire system wide commissioning function for the commissioning at the HRFU, the commissioning at the optic cable, and the commissioning at the RU.

12. The optic distributed system of claim 10, wherein the user interface comprises a Web-based graphic user interface.

13. A method of utilizing a single controller for commissioning an optic distributed system comprising a head end unit (HU) comprising a head end radio frequency unit (HRFU) and a first detector for monitoring signals at the HU, at least one remote unit (RU) comprising a second detector for monitoring signals at the RU, a corresponding optic cable connected between the HRFU and the at least one RU, and the single controller, the method comprising:

detecting a forward radio frequency (RF) signal received from a base transceiver station (BTS);

receiving signals detected by the first and second detectors;

performing a system wide commissioning function by concurrently performing commissioning on each of the HRFU, the at least one RU, and the corresponding optic cable when the forward RF signal is detected;

controlling the commissioning on the HRFU according to a signal strength of the forward RF signal received from the BTS and detected by the first detector;

controlling the commissioning on the at least one RU according to a signal intensity of an output signal from the RU detected by the second detector; and controlling the commissioning on the optic cable by compensating for losses in the optic cable during signal transmissions between the HRFU and the at least one RU.

14. The optic distributed system of claim 13, wherein the detecting the forward RF signal comprises monitoring the signal strength of the forward RF signal, and wherein the method further comprises adjusting the signal strength of the forward RF signal according to the monitoring results, so that the forward RF signal has an optimum output.

15. The optic distributed system of claim 13, wherein the system wide commissioning function is performed automatically.

16. The optic distributed system of claim 15, wherein parameters of the system wide commissioning function are adjustable via a user interface.

17. The optic distributed system of claim 16, wherein the parameters of the system wide commissioning function are adjustable by setting a single target value for the entire system wide commissioning function for the commissioning at the HRFU, the commissioning at the optic cable, and the commissioning at the RU.

18. The optic distributed system of claim 16, wherein the parameters of the system wide commissioning function are adjustable by setting a step-based system wide commissioning function comprising setting separate values for the commissioning at the HRFU, the commissioning at the optic cable, and the commissioning at the RU.

19. The optic distributed system of claim 10, wherein the user, interface is configured to allow the user to set a step-based system wide commissioning function comprising setting separate values for the commissioning at the HRFU, the commissioning at the optic cable, and the commissioning at the RU.

* * * * *